US010163129B1

(12) United States Patent
Agarwal et al.

(10) Patent No.: US 10,163,129 B1
(45) Date of Patent: Dec. 25, 2018

(54) METHOD AND APPARATUS FOR PROVIDING PROMOTION RECOMMENDATIONS

(71) Applicant: Groupon, Inc., Chicago, IL (US)

(72) Inventors: Nipun Agarwal, Mountain View, CA (US); Rajesh Girish Parekh, San Jose, CA (US); Ying Chen, Campbell, CA (US)

(73) Assignee: Groupon, Inc., Chicago, IL (US)

(*) Notice: Subject to any disclaimer, the term of this patent is extended or adjusted under 35 U.S.C. 154(b) by 535 days.

(21) Appl. No.: 14/479,267

(22) Filed: Sep. 5, 2014

(51) Int. Cl.
*G06Q 30/00* (2012.01)
*G06Q 30/02* (2012.01)
*G06N 5/04* (2006.01)

(52) U.S. Cl.
CPC .......... *G06Q 30/0255* (2013.01); *G06N 5/04* (2013.01)

(58) Field of Classification Search
CPC .......... G06Q 30/0206; G06Q 30/0201; G06Q 20/209; G06Q 50/12; G06Q 30/0222; G06Q 30/0282; G06Q 30/0251; G06Q 30/0269; G06Q 30/0631; G06Q 30/0255; G06Q 30/0236; G06Q 30/0254; G06Q 30/0204
See application file for complete search history.

(56) References Cited

U.S. PATENT DOCUMENTS

| | | | | |
|---|---|---|---|---|
| 5,594,790 A | * | 1/1997 | Curreri | H04M 3/36 379/265.12 |
| 6,182,050 B1 | * | 1/2001 | Ballard | G06Q 30/02 705/14.61 |
| 8,417,569 B2 | * | 4/2013 | Gross | G06F 17/30861 705/14.41 |
| 2003/0013483 A1 | * | 1/2003 | Ausems | H04M 1/72522 455/556.1 |

(Continued)

OTHER PUBLICATIONS

U.S. Appl. No. 13/930,519, filed Jun. 28, 2013, In re: Ayars et al. entitled *Method And Apparatus For Generating An Electronic Communication*.

(Continued)

*Primary Examiner* — Matthew T Sittner
(74) *Attorney, Agent, or Firm* — Alston & Bird LLP

(57) ABSTRACT

The present disclosure relates to methods, systems, and apparatuses for providing promotion recommendations using a promotion and marketing service. Some aspects may provide a method for providing a promotion recommendation framework. The method includes receiving, via a network interface, a promotion recommendation inquiry from a component of a promotion and marketing service, the promotion recommendation inquiry including electronic identification data identifying at least one of a consumer or a consumer characteristic. The method also includes identifying, via processing circuitry, promotion transaction information associated with the electronic identification data. The promotion transaction information includes electronic data (Continued)

identifying at least one transaction performed using the promotion and marketing service. The method also includes determining, via the processing circuitry, at least one promotion recommendation based on the promotion transaction information, and providing, via the network interface, the at least one promotion recommendation in response to the promotion recommendation inquiry.

26 Claims, 6 Drawing Sheets

(56) References Cited

U.S. PATENT DOCUMENTS

| | | | |
|---|---|---|---|
| 2003/0212626 A1 | 11/2003 | Vulkan | |
| 2004/0260874 A1* | 12/2004 | Mori | G06F 3/0604 |
| | | | 711/114 |
| 2006/0080171 A1* | 4/2006 | Jardins | G06Q 10/087 |
| | | | 705/14.68 |
| 2006/0271425 A1* | 11/2006 | Goodman | G06Q 30/02 |
| | | | 705/14.58 |
| 2007/0100688 A1* | 5/2007 | Book | G06Q 30/02 |
| | | | 705/14.52 |
| 2007/0150347 A1* | 6/2007 | Bhamidipati | G06Q 30/02 |
| | | | 705/14.54 |
| 2007/0150348 A1* | 6/2007 | Hussain | G06Q 30/02 |
| | | | 705/14.54 |
| 2007/0162328 A1* | 7/2007 | Reich | G06Q 30/02 |
| | | | 705/14.58 |
| 2007/0192369 A1* | 8/2007 | Gross | G06F 17/30861 |
| 2008/0109300 A1* | 5/2008 | Bason | G06Q 30/02 |
| | | | 705/14.73 |
| 2008/0215416 A1* | 9/2008 | Ismalon | G06F 17/30867 |
| | | | 705/14.54 |
| 2009/0099911 A1* | 4/2009 | Ota | G06Q 30/02 |
| | | | 705/14.66 |
| 2009/0112724 A1* | 4/2009 | Joo | G06Q 30/00 |
| | | | 705/14.53 |
| 2009/0144155 A1* | 6/2009 | Lora | G06Q 30/02 |
| | | | 705/14.62 |
| 2009/0328095 A1* | 12/2009 | Vinokurov | H04H 20/10 |
| | | | 725/32 |
| 2010/0198685 A1* | 8/2010 | Bayati | G06Q 30/02 |
| | | | 705/14.52 |
| 2010/0306225 A1* | 12/2010 | Mawani | G06Q 30/02 |
| | | | 707/759 |
| 2011/0161161 A1* | 6/2011 | Juda | G06Q 30/02 |
| | | | 705/14.42 |
| 2011/0264536 A1* | 10/2011 | Chodroff | G06Q 30/00 |
| | | | 705/14.69 |
| 2012/0016742 A1* | 1/2012 | Jiang | G06Q 30/00 |
| | | | 705/14.49 |
| 2012/0054022 A1* | 3/2012 | Kosashvili | G06F 17/30867 |
| | | | 705/14.43 |
| 2012/0158471 A1* | 6/2012 | Jain | G06Q 30/0241 |
| | | | 705/14.4 |
| 2012/0158502 A1* | 6/2012 | Chung | G06Q 30/0255 |
| | | | 705/14.53 |
| 2012/0158519 A1* | 6/2012 | Edwards | G06Q 30/0272 |
| | | | 705/14.68 |
| 2012/0198200 A1* | 8/2012 | Li | G06F 3/061 |
| | | | 711/171 |
| 2012/0221407 A1* | 8/2012 | Erasmus | G06Q 30/02 |
| | | | 705/14.43 |
| 2012/0246298 A1* | 9/2012 | McGowan | H04L 67/22 |
| | | | 709/224 |
| 2013/0006754 A1* | 1/2013 | Horvitz | G06Q 30/00 |
| | | | 705/14.43 |
| 2013/0246300 A1* | 9/2013 | Fischer | G06Q 30/0222 |
| | | | 705/347 |
| 2013/0254022 A1* | 9/2013 | Rubrecht | G06Q 30/0261 |
| | | | 705/14.48 |
| 2014/0002736 A1* | 1/2014 | Kaushal | H04N 7/088 |
| | | | 348/468 |
| 2014/0040040 A1 | 2/2014 | Townsend et al. | |
| 2014/0081767 A1* | 3/2014 | Zhang | G06Q 30/02 |
| | | | 705/14.66 |
| 2014/0082660 A1* | 3/2014 | Zhang | H04N 21/258 |
| | | | 725/32 |
| 2014/0143043 A1* | 5/2014 | Wickramasuriya | H04N 21/41407 |
| | | | 705/14.45 |
| 2014/0143803 A1* | 5/2014 | Narsimhan | H04N 5/44591 |
| | | | 725/34 |
| 2014/0149221 A1* | 5/2014 | Rycyna, III | G06Q 30/0264 |
| | | | 705/14.61 |
| 2014/0181694 A1* | 6/2014 | Barman | G06F 3/0484 |
| | | | 715/753 |
| 2014/0211699 A1* | 7/2014 | Zhou | H04W 48/12 |
| | | | 370/329 |
| 2014/0355955 A1* | 12/2014 | Berger | H04L 67/20 |
| | | | 386/248 |
| 2014/0365675 A1* | 12/2014 | Bhardwaj | H04L 65/60 |
| | | | 709/231 |
| 2015/0025962 A1* | 1/2015 | Becket | G06Q 30/0277 |
| | | | 705/14.48 |
| 2015/0348093 A1* | 12/2015 | Jiang | G06Q 30/0246 |
| | | | 705/14.45 |
| 2015/0356612 A1* | 12/2015 | Mays | G06O 30/0241 |
| | | | 705/14.61 |

OTHER PUBLICATIONS

U.S. Appl. No. 13/930,527, filed Jun. 28, 2013, In re: Ayars et al. entitled *Method And Apparatus For Generating An Electronic Communication*.
U.S. Appl. No. 13/930,532, filed Jun. 28, 2013, In re: Ayars et al. entitled *Method And Apparatus For Generating An Electronic Communication*.
U.S. Appl. No. 14/219,349, filed Mar. 19, 2014, In re: Ayars et al. entitled *Method And Apparatus For Generating An Electronic Communication*.
U.S. Appl. No. 14/453,179, filed Aug. 6, 2014, In re: Ayars et al. entitled *Methods And Apparatus For Generating An Electronic Communication*.
U.S. Appl. No. 61/989,960, filed May 7, 2014, In re: Agarwa et al. entitled *Generating In-Channel and Cross-Channel Promotion Recommendations Using Promotion Similarity*.
U.S. Appl. No. 61/989,968, filed May 7, 2014, In re: Agarwal et al. entitled *Generating In-Channel and Cross-Channel Promotion Recommendations Using Promotion Cross-Sell*.

* cited by examiner

METHOD AND APPARATUS FOR PROVIDING PROMOTION RECOMMENDATIONS

TECHNOLOGICAL FIELD

Example embodiments of the present invention relate generally to providing content for electronic marketing communications and, more particularly, to methods, systems, and apparatuses for providing promotion recommendations for inclusion in electronic marketing communications.

BACKGROUND

The applicant has discovered problems with current methods, systems, and apparatuses for determining recommended promotions and providing said promotion recommendations. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product provide promotion recommendations. Example embodiments may include methods and apparatuses for selecting promotions for recommendation based on past transactions with a promotion and marketing service. An example embodiment of a method for providing promotion recommendations based on transactions performed using a promotion and marketing service includes performing, via a promotion and marketing service, at least one electronic transaction between a consumer and the promotion and marketing service to offer, via the electronic transaction, at least one promotion to the consumer, and storing a set of transaction data in a memory. The set of transaction data includes electronic data indicating the at least one transaction. The method further includes determining, via processing circuitry, a plurality of promotion clusters from the set of transaction data, determining, via the processing circuitry, one or more correlation metrics for each of the plurality of promotion clusters, storing the one or more correlation metrics in the memory, generating at least one promotion recommendation based at least in part on the one or more correlation metrics, filtering, via processing circuitry, the at least one promotion recommendation based on a determination as to whether the at least one promotion recommendation is valid, in response to determining that the at least one promotion recommendation is valid, generating, via the processing circuitry, an electronic marketing communication comprising the at least one promotion recommendation, and transmitting, via communications circuitry, the electronic marketing communication.

Embodiments of the method may also include, in response to determining that the at least one promotion recommendation is not valid, selecting an alternative promotion recommendation and generating the electronic marketing communication using the alternative promotion recommendation instead of the at least one promotion recommendation. The alternative promotion recommendation may include at least one characteristic in common with the at least one promotion recommendation. The at least one characteristic may be at least one of a merchant type, a location, a redemption parameter, or an offering parameter. The filtering of the at least one promotion recommendation may include at least one of determining whether the at least one promotion recommendation is expired, determining whether the at least one promotion recommendation has a valid location, or determining whether the at least one promotion has a sufficient quantity available. The method may also include determining that the at least one promotion recommendation includes less than a threshold number of promotion recommendations, and selecting an alternative promotion recommendation methodology other than a first promotion recommendation methodology in response to determining that the at least one promotion recommendation includes less than a threshold number of promotion recommendations. The at least one promotion recommendation may be generated by the first promotion recommendation methodology and the alternative promotion recommendation may be generated by the alternative promotion recommendation methodology. Determining that the at least one promotion includes less than the threshold number of promotion recommendations may be performed after filtering the at least one promotion recommendation. The alternative promotion recommendation methodology may select the alternative promotion recommendation based on analysis of promotion cluster pairs and the first promotion recommendation methodology may select the at least one promotion recommendation based on analysis of promotion cluster triplets.

Another example embodiment includes an apparatus for providing promotion recommendations based on transactions performed using a promotion and marketing service. The apparatus includes promotion management circuitry, recommendation engine circuitry, and electronic marketing communication generation circuitry. The promotion management circuitry is configured to offer at least one promotion for sale via a promotion and marketing service, to perform, via the promotion and marketing service, at least one electronic transaction between a consumer and the promotion and marketing service to offer, via the electronic transaction, the at least one promotion to the consumer, and to store a set of transaction data in a memory. The set of transaction data includes electronic data indicating the at least one transaction. The recommendation engine circuitry is configured to determine a plurality of promotion clusters from the set of transaction data, to determine one or more correlation metrics for each of the plurality of promotion clusters, to store the one or more correlation metrics in the memory, to generate at least one promotion recommendation based at least in part on the one or more correlation metrics, and to filter the at least one promotion recommendation based on a determination as to whether the at least one promotion recommendation is valid. The electronic marketing communication generation circuitry is configured to, in response to determining that the at least one promotion recommendation is valid, generate an electronic marketing communication comprising the at least one promotion recommendation, and to transmit the electronic marketing communication.

In some embodiments, the recommendation engine circuitry may be further configured to, in response to determining that the at least one promotion recommendation is not valid, select an alternative promotion recommendation and generate the electronic marketing communication using the alternative promotion recommendation instead of the at least one promotion recommendation. The alternative promotion recommendation may include at least one characteristic in common with the at least one promotion recommendation. The at least one characteristic may be at least one of a merchant type, a location, a redemption parameter, or an offering parameter. The recommendation engine circuitry may be configured to filter the at least one promotion recommendation further by at least one of determining whether the at least one promotion recommendation is expired, determining whether the at least one promotion recommendation has a valid location, or determining whether the at least one promotion has a sufficient quantity available.

\The recommendation engine circuitry may be further configured to determine that the at least one promotion recommendation includes less than a threshold number of promotion recommendations, and to select an alternative promotion recommendation methodology other than a first promotion recommendation methodology in response to determining that the at least one promotion recommendation includes less than a threshold number of promotion recommendations. The at least one promotion recommendation may be generated by the first promotion recommendation methodology and the alternative promotion recommendation may be generated by the alternative promotion recommendation methodology. The recommendation engine circuitry may be configured to determine that the at least one promotion includes less than the threshold number of promotion recommendations after filtering the at least one promotion recommendation. The alternative promotion recommendation methodology may select the alternative promotion recommendation based on analysis of promotion cluster pairs and the first promotion recommendation methodology selects the at least one promotion recommendation based on analysis of promotion cluster triplets.

Example embodiments also include a computer program product comprising a non-transitory computer readable storage medium storing instructions that, when executed by a processor, cause the processor to configure an apparatus. The instructions cause the processor to configure the apparatus to perform at least one electronic transaction between a consumer and the promotion and marketing service to offer, via the electronic transaction, at least one promotion to the consumer, and to store a set of transaction data in a memory. The set of transaction data includes electronic data indicating the at least one transaction. The instructions further cause the processor to configure the apparatus to determine a plurality of promotion clusters from the set of transaction data, to determine one or more correlation metrics for each of the plurality of promotion clusters, to store the one or more correlation metrics in the memory, to generate at least one promotion recommendation based at least in part on the one or more correlation metrics, to filter the at least one promotion recommendation based on a determination as to whether the at least one promotion recommendation is valid, in response to determining that the at least one promotion recommendation is valid, to generate an electronic marketing communication comprising the at least one promotion recommendation, and to transmit the electronic marketing communication.

Embodiments of the computer program product may also include program instructions that cause the processor to configure the apparatus to, in response to determining that the at least one promotion recommendation is not valid, select an alternative promotion recommendation and generate the electronic marketing communication using the alternative promotion recommendation instead of the at least one promotion recommendation. The alternative promotion recommendation may include at least one characteristic in common with the at least one promotion recommendation. The at least one characteristic may be at least one of a merchant type, a location, a redemption parameter, or an offering parameter. The filtering of the at least one promotion recommendation may include at least one of determining whether the at least one promotion recommendation is expired, determining whether the at least one promotion recommendation has a valid location, or determining whether the at least one promotion has a sufficient quantity available. The instructions may further cause the processor to configure the apparatus to determine that the at least one promotion recommendation includes less than a threshold number of promotion recommendations, and to select an alternative promotion recommendation methodology other than a first promotion recommendation methodology in response to determining that the at least one promotion recommendation includes less than a threshold number of promotion recommendations. The at least one promotion recommendation may be generated by the first promotion recommendation methodology and the alternative promotion recommendation is generated by the alternative promotion recommendation methodology. Determining that the at least one promotion includes less than the threshold number of promotion recommendations may be performed after filtering the at least one promotion recommendation. The alternative promotion recommendation methodology may select the alternative promotion recommendation based on analysis of promotion cluster pairs and the first promotion recommendation methodology may select the at least one promotion recommendation based on analysis of promotion cluster triplets.

Another example embodiment includes an apparatus for providing promotion recommendations based on transactions performed using a promotion and marketing service. The apparatus includes means for performing at least one electronic transaction between a consumer and the promotion and marketing service to offer, via the electronic transaction, at least one promotion to the consumer, and means for storing a set of transaction data in a memory. The set of transaction data includes electronic data indicating the at least one transaction. The apparatus further includes means for determining a plurality of promotion clusters from the set of transaction data, means for determining one or more correlation metrics for each of the plurality of promotion clusters, means for storing the one or more correlation metrics in the memory, means for generating at least one promotion recommendation based at least in part on the one or more correlation metrics, means for filtering the at least one promotion recommendation based on a determination as to whether the at least one promotion recommendation is valid, means for, in response to determining that the at least one promotion recommendation is valid, generating, an electronic marketing communication comprising the at least one promotion recommendation, and means for transmitting the electronic marketing communication.

The apparatus may further include means for, in response to determining that the at least one promotion recommendation is not valid, selecting an alternative promotion recommendation and generate the electronic marketing communication using the alternative promotion recommendation instead of the at least one promotion recommendation. The alternative promotion recommendation may include at least one characteristic in common with the at least one promotion recommendation. The at least one characteristic may be at least one of a merchant type, a location, a redemption parameter, or an offering parameter. The means for filtering of the at least one promotion recommendation may include at least one of means for determining whether the at least one promotion recommendation is expired, means for determining whether the at least one promotion recommendation has a valid location, or means for determining whether the at least one promotion has a sufficient quantity available. The apparatus may also include means for determining that the at least one promotion recommendation includes less than a threshold number of promotion recommendations, and means for selecting an alternative promotion recommendation methodology other than a first promotion recommendation methodology in response to determining that the at least one promotion recommendation includes less than a threshold number of promotion recommendations. The at least one promotion recommendation may be generated by the first promotion recommendation methodology and the alternative promotion recommendation may be generated by the alternative promotion recommendation methodology. Determining that the at least one promotion includes less than the threshold number of promotion recommendations may be performed after filtering the at least one promotion recommendation. The alternative promotion recommendation methodology may select the alternative promotion recommendation based on analysis of promotion cluster pairs and the first promotion recommendation methodology may select the at least one promotion recommendation based on analysis of promotion cluster triplets.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
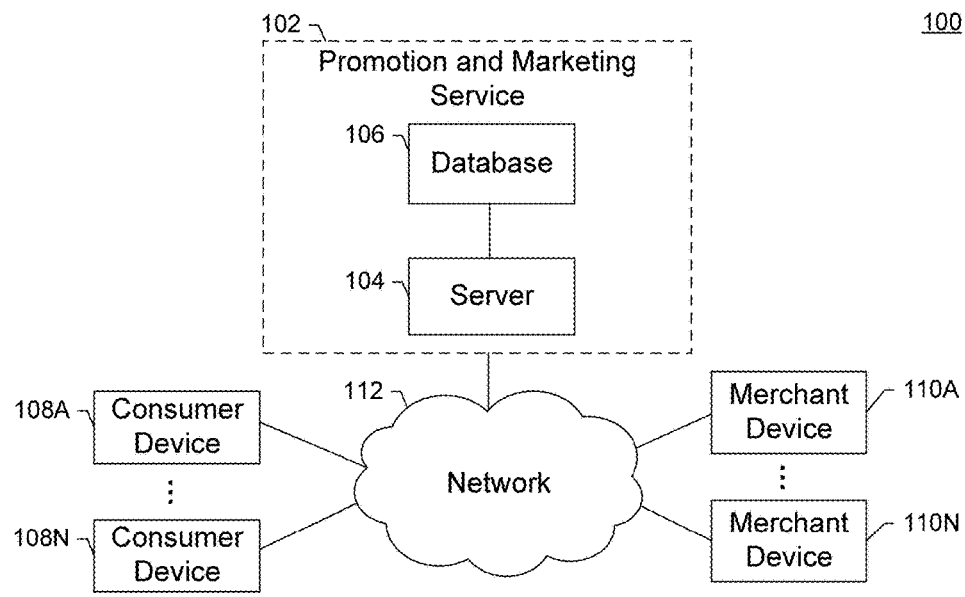
Figure 2:
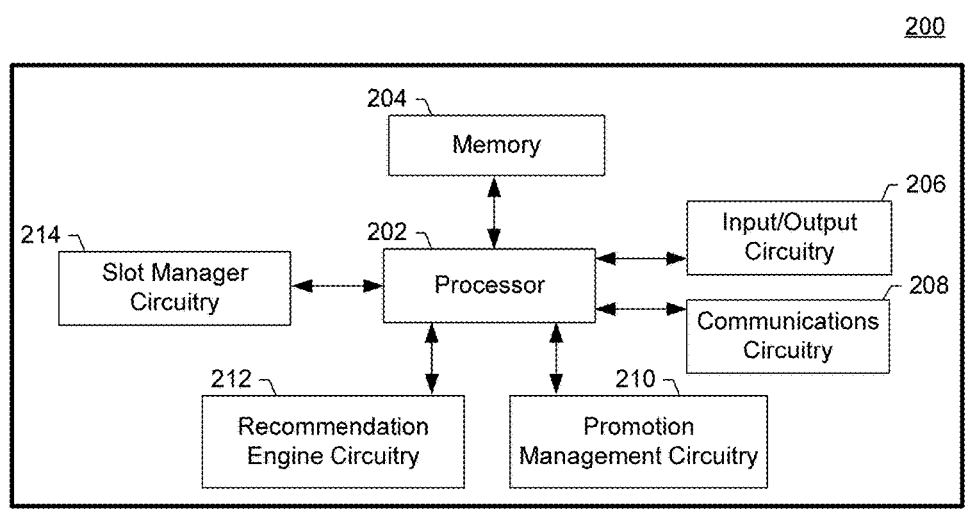
Figure 3:
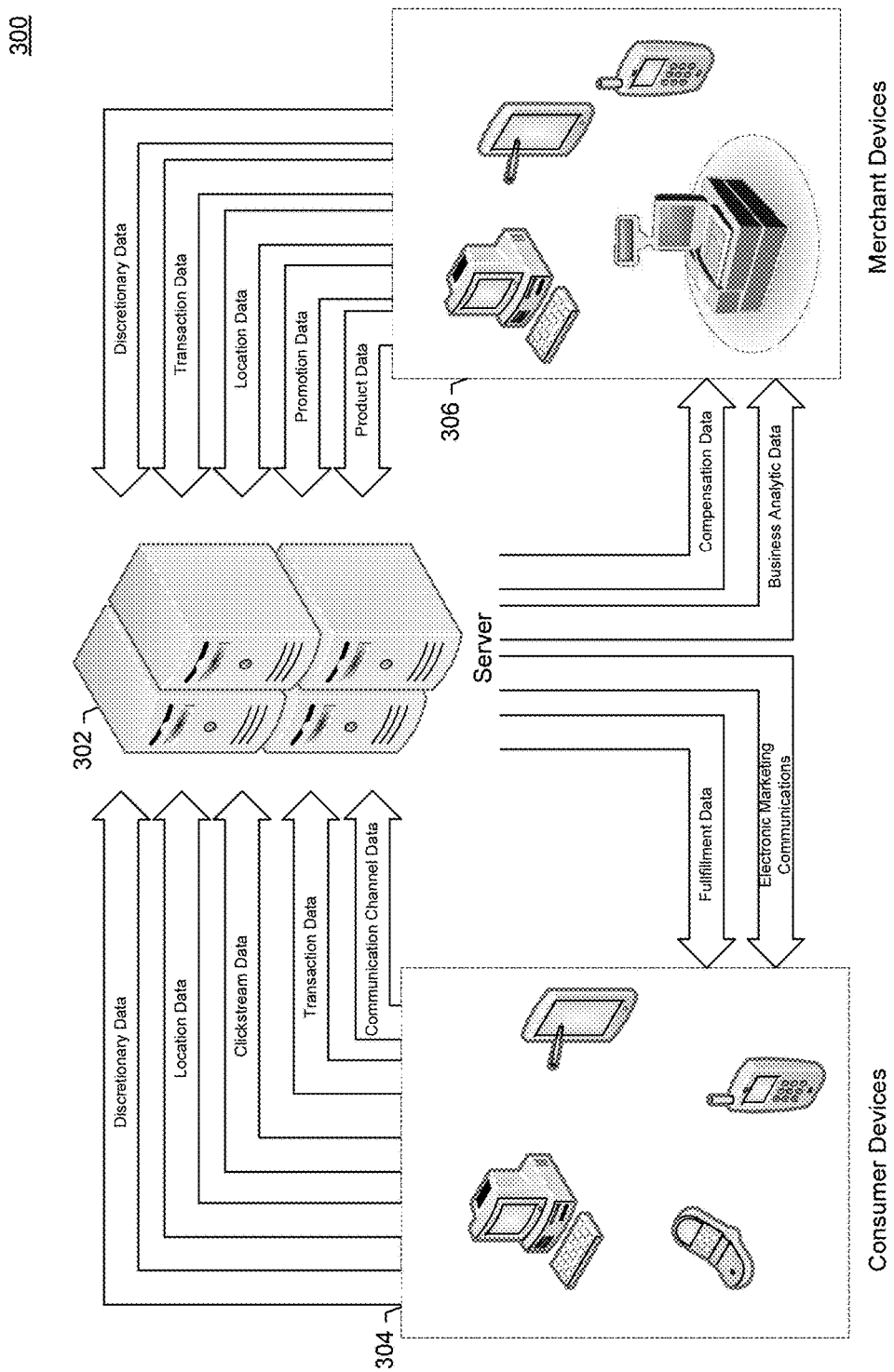
Figure 4:
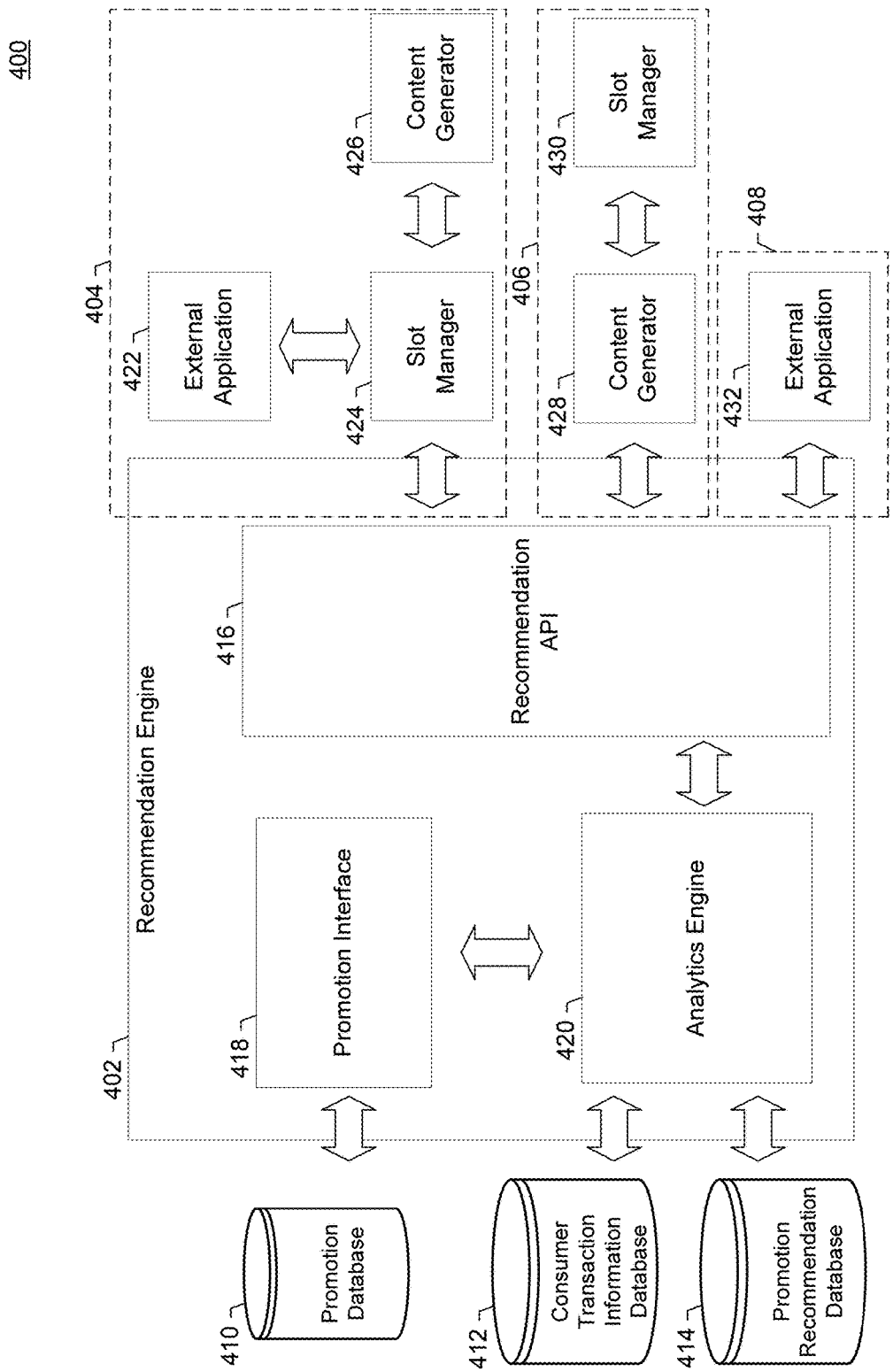
Figure 5:
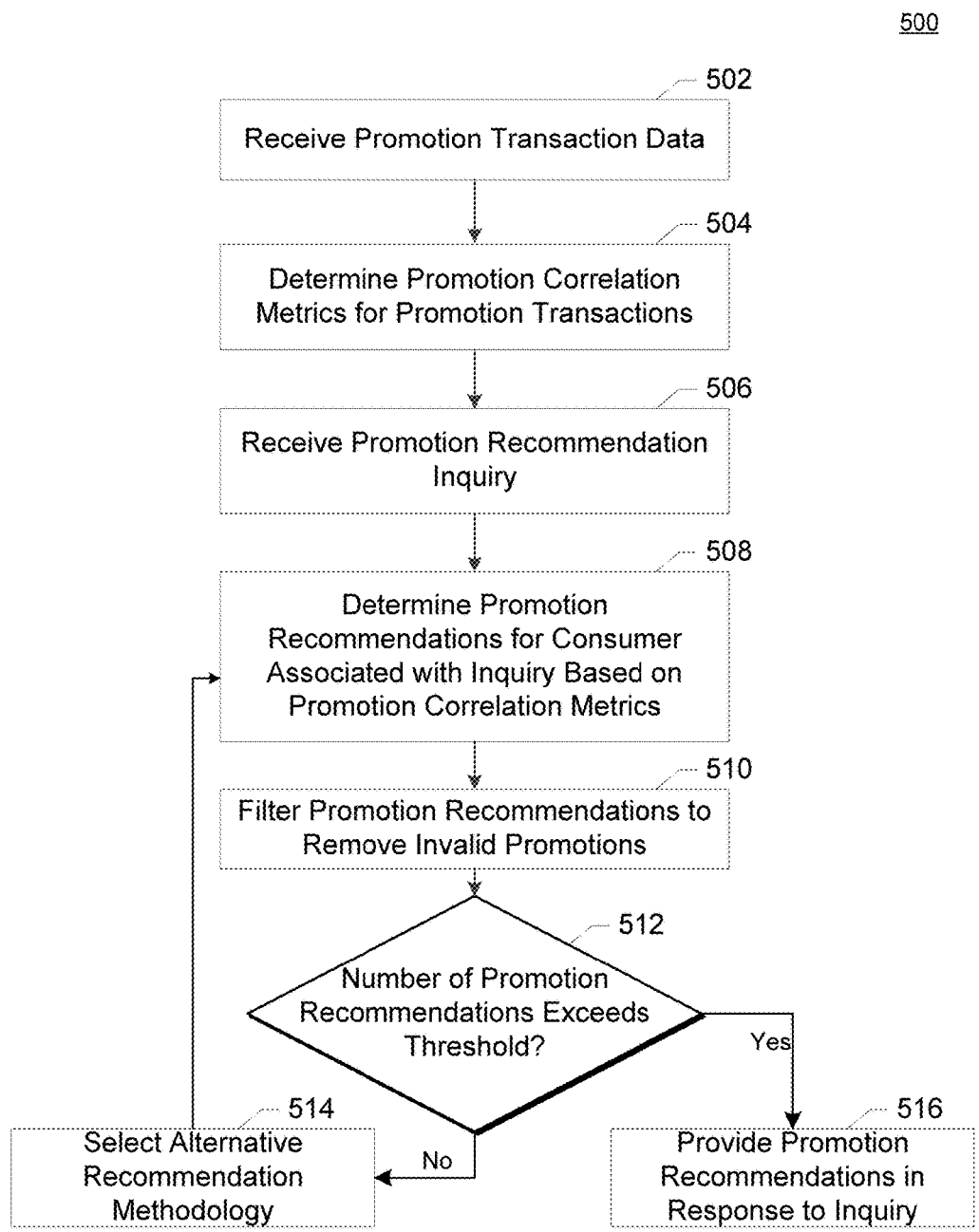
Figure 6:
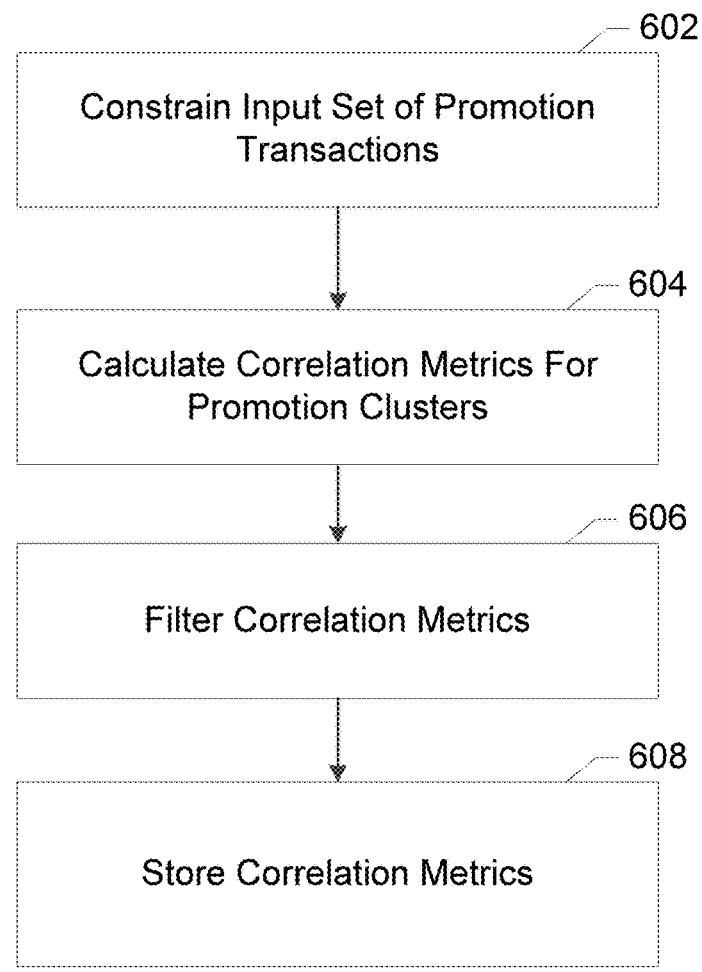
Figure 7:
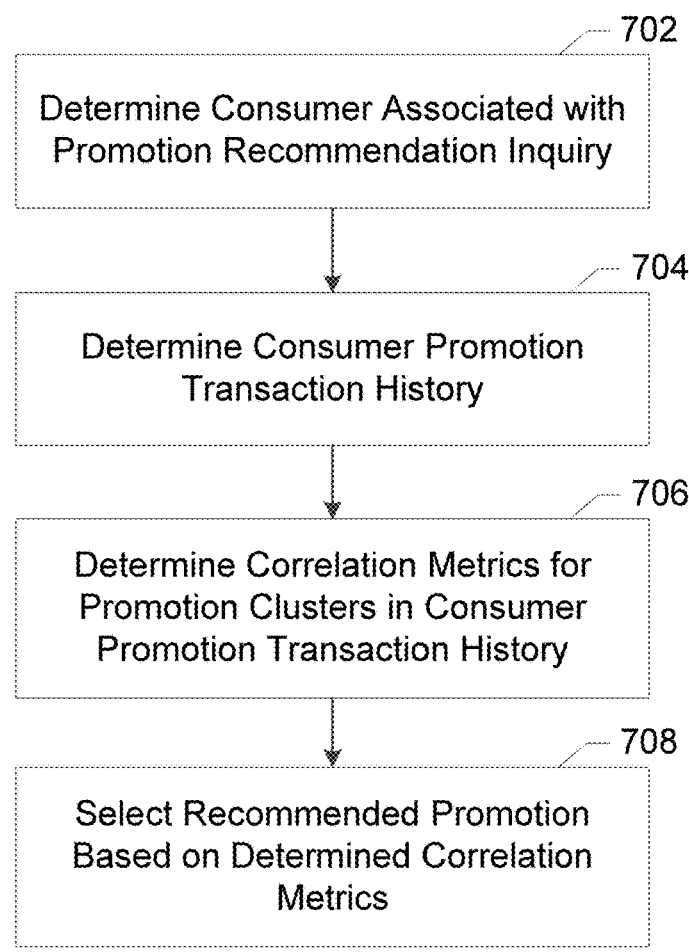

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a promotion recommendation engine using special-purpose circuitry in accordance with some example embodiments of the present invention;

FIG. 3 illustrates an example data flow among a consumer device, a server, and a merchant device in accordance with some example embodiments of the present invention;

FIG. 4 illustrates an example data flow interaction between elements of an example device for implementing a promotion recommendation engine in accordance with some example embodiments of the present invention;

FIG. 5 illustrates a flowchart describing example operations for providing promotion recommendations in accordance with some example embodiments of the present invention;

FIG. 6 illustrates a flowchart describing example operations for determining correlation metrics among promotions in accordance with some example embodiments of the present invention; and FIG. 7 illustrates a flowchart describing example operations for selecting recommended promotions for use in an electronic marketing communication in accordance with some example embodiments of the present invention.

DETAILED DESCRIPTION

Overview

Various embodiments of the present invention are directed to improved apparatuses, methods, and computer readable media for selecting recommended promotions for inclusion in electronic marketing communications. In this regard, embodiments of the present invention provide systems, devices, and frameworks for analyzing electronic marketing information and selecting one or more promotions for recommendation to a consumer based on past purchases using a promotion and marketing service. In particular, some embodiments determine correlation metrics for associations between past promotion transactions by the consumer. The promotion recommendations may be made to the consumer based on those correlations. Some embodiments further provide a promotion recommendation framework that is operable to receive promotion recommendation inquiries from other devices, systems, and/or circuitry. In response to these inquiries, embodiments may provide promotion recommendations. In particular, some embodiments provide a promotion recommendation application programming interface (API) that allows external devices, systems, and/or circuitry to submit promotion recommendation inquiries.

In some embodiments, promotion recommendation inquiries may be received from a slot management infrastructure. In particular, a slot manager and/or slot manager circuitry may generate a promotion recommendation inquiry as part of generating an electronic marketing communication. The promotion recommendation framework may provide a recommended promotion in response to the inquiry for inclusion in an outgoing electronic marketing communication. In some embodiments, the slot management infrastructure may further include one or more content generators selected and/or managed by the slot manager and/or slot manager circuitry. In some embodiments, the promotion recommendation inquiries may be received directly from the one or more content generators instead of from the slot manager and/or slot manager circuitry. Example embodiments of a slot manager infrastructure are described more fully in U.S. patent application Ser. Nos. 13/930,519, 13/930,527, 13/930,532, 14/219,349, 14/453,179, which are herein incorporated by reference in their entirety.

It should be readily appreciated that the embodiments of the methods, systems, devices, and apparatuses for providing promotion recommendations may be configured in various additional and alternative manners to provide promotion recommendations within the context of a promotion and marketing service as described herein.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "content generator" should be understood to include any method, process, application, algorithm, or the like that is operable to select content for an electronic marketing communication. For example, content generators may be "widgets", "apps", "applets" or any other software, hardware and/or method that, when executed or performed by a programmed computer, provides content for insertion into an electronic communication, such as by providing content to fill a slot of the electronic communication. Content generators may be associated with particular types of content. For example, content generators may be associated with only promotion content or non-promotion content, content generators may be associated with a particular type of promotion (e.g., a content generator for promotions redeemable for a particular good, a content generator for promotions redeemable for a particular discount value, or a content generator for promotions redeemable for a particular vacation), a particular type of merchant (e.g., a content generator for restaurant promotions, a content generator for spa treatment promotions, or a content generator for home remodeling promotions), a particular date (e.g., content generators for Valentine's Day, Tax Return day, the Fourth of July, or Labor Day), a particular season (e.g., content generators for ski trips in the Winter, and different content generators for beach trips in the summer), a particular location (e.g., a content generator for promotions in a particular zip code or state, or a content generator related to a specific latitude and longitude), a particular data gathering operation (e.g., a content generator to request a consumer's zip code, a content generator to request a consumer's favorite restaurant type), a particular notification type (e.g., a content generator to inform a consumer of the promotion and marketing service's privacy policy), a particular type of interest as express explicitly or implicitly by a user (e.g., filling out a questionnaire indicating "I like Italian food and luxury goods deals"), based on a user's relationship status (e.g., content generators for "Date Night" content for married couples with children), consumer social network activity (e.g., content generators that detect pages the user has "liked" and select content accordingly), or any other type of content that may be suitable for inclusion in an electronic communication.

Content generators may include content to be provided by the content generator, or the content may be stored external to the content generator and the content generator may access or provide access (i.e., by providing a database address, etc.) to the externally stored content. For example, a particular content generator may store a set of promotion parameters, images, and terms for a given promotion, and provide said parameters, images, and terms for use in an electronic communication, or the promotion parameters, images, and terms may be stored in a promotion database and the content generator may provide a reference to or address for the parameters, images, and terms for generation of an electronic communication.

Content generators may also include assignment preference logic. Content generators may have certain preferences for certain electronic communications or certain slots within a communication. For example, a content generator may include assignment preference logic that indicates a preference to be included in e-mail electronic communications rather than webpage electronic communications, or the content generator may include preference data that indicates a preference to be included in an electronic communication only when the content generator is assigned to the first slot displayed within the electronic communication.

In some embodiments, content generators may be created using an authoring tool or module. The authoring tool may allow for generation of content generators that select and/or provide content according to any method, process, or algorithm. For example, a content generator author may use the content authoring tool to write an algorithm that, when the content generator is executed, causes the content generator to offer a particular type of content or set of content to a slot manager for inclusion in an electronic communication. It should be understood that any process, system, tool, or algorithm could be employed to select the content within the content generator and that the instant application is not intended to be limited to a particular content generator, but rather describes a framework for integration of any user-defined content generator that is operable to communicate content to the slot generator.

Content generators may also include bid logic by which the content generator may determine a bid amount for a particular content slot. In this manner, content generators may use internal logic to identify how valuable a particular content slot is to the content generator for that particular slot, for that particular user, for that particular location, and/or at that particular time.

It should be appreciated that content generators as described herein are not static selections of particular content. For example, a slot manager module does not select particular content for insertion into particular slots of an electronic communication. Rather, a slot manager may select content generators that utilize their own respective internal logic to select content for their assigned slot(s).

As used herein, the terms "slot" and "content slot" should be understood to refer to a defined region of the electronic marketing communication into which content may be inserted. Slots may be defined by particular coordinates in an n-dimensional coordinate space (e.g., x and y coordinates establishing absolute positions within the electronic communication), a particular position relative to other slots within the electronic communication (e.g., display slot 1 at the top of the electronic communication, then slot 2, then slot 3, etc.), based on particular rules for the electronic communication (e.g., a title slot, a sidebar slot, a pop-up advertisement slot, a hover-over slot), or according to any other mechanism for dividing the electronic communication into one or more regions. Slots may also include slot metadata. For example, slots may be associated with a particular type of content (e.g., a promotion content slot and a non-promotion content slot). Alternatively, slots may be operable to receive any type of content. Slots may also include specific content generators that are eligible or ineligible for use in the slot, such that only eligible content generators may be permitted to submit bids for the slot, or ineligible content generators may be prevented from bidding on the slot. Slots may have a specific size (e.g., a length and a width), or they may be flexible in size. Slots may also include information indicating other slot parameters, such as the whether the slot is "above the fold" of the electronic communication (e.g., immediately visible to a consumer receiving the electronic communication without requiring a scroll operation for viewing), or the slot's relative position in the electronic communication (e.g., first, second third, etc.).

As used herein, the term "promotion recommendation" is intended to refer to electronic data or information that includes a reference sufficient to identify a particular promotion or promotion content by electronic circuitry. For example, promotion recommendations may include a response to an API request for a promotion recommendation, where that API request includes an electronic identifier for a particular promotion maintained by a promotion and marketing service. In some embodiments, promotion recommendations may include a particular set of promotion content (e.g., an image, a text string, an audio file, or the like) in addition to or as an alternative to a promotion identifier. In some embodiments, the promotion recommendation may require a database lookup to be performed using a unique identifier or other value included in the promotion recommendation to identify the particular promotion that is the subject of the recommendation. For example, a promotion recommendation provided to a slot manager or content generator may provide a promotion identifier as stored in a promotion database, and the receiving slot manager or content generator may use the promotion identifier to look up promotion components of the particular promotion identified by the promotion identifier.

In some embodiments, the promotion recommendation may include some, any, or all information stored in a promotion database and associated with a particular promotion. For example, the promotion recommendation may include electronic data indicating the terms and conditions of the promotion, offering parameters for the promotion, redemption parameters of the promotion, and/or any other promotion components associated with a recommended promotion. A promotion recommendation may, in some embodiments, include references to a plurality of promotions.

As used herein, the term "promotion recommendation inquiry" is intended to refer to electronic data received or generated by a system, device, or apparatus that indicates that the system, device, or apparatus, should provide a promotion recommendation. Promotion recommendation inquiries may include various forms of electronic data, including but not limited to API requests. In particular, promotion recommendation inquiries include electronic identification data. The electronic identification data includes data sufficient to identify a particular user or user characteristics sufficient to identify particular transactions performed using a promotion and marketing service by the particular user or users with the particular user characteristics.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

As noted above, one of the primary functions of a promotion and marketing service is to select content to be provided to consumers through electronic marketing communications. By carefully selecting content that is likely to be of interest to consumers for inclusion in electronic marketing communication, the promotion and marketing service maximizes the chance that a given electronic marketing communication will generate a sale. However, poor selection processes and improperly configured devices for providing promotion recommendations may reduce the accuracy of recommended promotions, thus reducing the marketing benefit achieved from electronic marketing communications. Furthermore, content that is sent to consumers consumes resources of both the promotion and marketing service and consumer devices, cluttering communication systems (e.g., e-mail or text message in-boxes) and consuming bandwidth and processor resources. Additionally, implementation of recommendation systems into components of the promotion and marketing service may require substantial resources for integration and testing. When a change is made to a recommendation system, it may be necessary to individually update each component that uses a version of the recommendation system.

In response to these problems and other problems, the inventors have identified methods and apparatuses for providing improved promotion recommendations. Embodiments of the present invention related to methods, systems, devices, apparatuses, and the like for recommending promotions based on analysis of electronic marketing information. In particular, embodiments utilize transaction data processed by a promotion and marketing service to provide promotion recommendations based on past promotions purchased by consumers. Embodiments further provide improved frameworks for providing these promotion recommendations for use in electronic marketing communications. In this manner, embodiments allow for more accurate recommendations, resulting in the need to send fewer electronic marketing communications to achieve the same overall marketing benefit. As such, embodiments provide for improved efficiency of processor, network, and memory resources due to the ability to achieve the same, similar, or improved results with fewer outgoing electronic marketing communications. Furthermore, embodiments may provide a simplified framework for providing promotion recommendations, allowing other electronic system components to request and receive promotion recommendations in a flexible, straightforward manner. This framework may reduce the testing, development, and maintenance resources required to implement promotion recommendations in said electronic system components by replacing integrated recommendation engines with an interface to the promotion recommendation framework.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to generate promotion recommendations for use in electronic marketing communications as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, promotion management circuitry 210, recommendation engine circuitry 212, and slot manager circuitry 214. The apparatus 200 may be configured to execute the operations described above with respect to FIG. 1 and below with respect to FIGS. 4-7. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The promotion management circuitry 210 includes hardware configured to generate, provide, and manage promotions offered by a promotion and marketing service. The promotion management circuitry 210 may be configured to receive a request from a merchant to generate a new promotion and, in response to the request, facilitate the offering of the new promotion via the promotion and marketing service. In some embodiments, the promotion management circuitry 210 may be further configured to programmatically and/or automatically provide, offer, or generate promotions in response to the occurrence of a criterion or criteria. For example, a merchant may define a particular set of criteria that cause the promotion management circuitry 210 to offer a particular promotion or promotions. The promotion management circuitry 210 may manage promotions stored in a memory, such as the memory 204, and store promotions in the memory in response to the promotion being newly generated. In some embodiments, the promotion management circuitry 210 may dynamically control the offering parameters for a promotion or promotions in response to the occurrence of the set of criteria. The promotion management circuitry 210 may utilize processing circuitry, such as the processor 202, to perform these actions. The promotion management circuitry 210 may receive the request and/or otherwise communicate with a merchant device via a network interface provided by the communications circuitry 208. However, it should also be appreciated that, in some embodiments, the promotion management circuitry 210 may include a separate processor, specially configured field programmable gate array (FPGA), or application specific interface circuit (ASIC) to manage the offering of promotions via a promotion and marketing service. The promotion management circuitry 210 is therefore implemented using hardware components of the apparatus configured by either hardware or software for implementing these planned functions.

The recommendation engine circuitry 212 includes hardware configured to manage, store, process, and analyze electronic marketing information to generate and provide promotion recommendations. The recommendation engine circuitry 212 may be configured to receive electronic marketing information via various sources, such as through a network interface provided by the communications circuitry 208, and to analyze the electronic marketing information to generate promotion recommendations using processing circuitry, such as the processor 202. The recommendation engine circuitry 212 may interface with a promotion database stored in a storage device, such as the memory 204, to obtain a set of promotions. The recommendation engine circuitry 212 may further interface with a storage device, such as the memory 204, to obtain the electronic marketing information used to generate the promotion recommendations. The promotion recommendations may be provided via a communications interface, such as provided by the communications circuitry 208.

The recommendation engine circuitry 212 may also be configured to implement a promotion recommendation framework for providing promotion recommendations in response to requests from other components of a promotion and marketing service. In particular, the recommendation engine circuitry 212 may be configured to access and analyze consumer transactions performed with the promotion and marketing service and/or one or more merchants to identify correlation metrics relating to relationships between transactions for purchased promotions. These correlation metrics may be employed by the recommendation engine circuitry 212 to generate promotion recommendations. An example data flow within and throughout an example promotion recommendation framework such as may be provided by or in conjunction with the recommendation engine circuitry 212 is described further below with respect to FIG. 4.

The recommendation engine circuitry 212 may also be operable to filter and curate promotion recommendations associated with particular consumers, groups of consumers, or aspects thereof. For example, the recommendation engine circuitry 212 may ensure that promotion recommendations are of a minimum quantity or quality, based on the correlation metrics, data received from a promotion database, and/or various other factors. Example embodiments of operations that may employ recommendation engine circuitry 212 to generate promotion recommendations are described further below with respect to FIGS. 4-7.

The slot manager circuitry 214 includes hardware configured to assign content generators and/or content to particular portions of an electronic marketing communication. The slot manager circuitry 214 may be configured to assign content generators and/or content to particular portions or "slots" of an electronic marketing communication or electronic marketing communication template to be used to generate electronic marketing communications that are transmitted by a promotion and marketing service. The slot manager circuitry 214 includes processing circuitry configured to assist with selection and assignment of content generators and/or content to particular slots of the electronic marketing communication. In some embodiments, the slot manager circuitry 214 interacts with the recommendation engine circuitry 212 to request promotion recommendations. For example, the slot manager circuitry 214 may make requests, either for the slot manager circuitry 214 directly or on behalf of one or more content generators, via an interface, bridge device, API, or the like to send a promotion recommendation inquiry to the recommendation engine circuitry 212. It should be appreciated that, in the present context, the slot manager circuitry 214 is given as an example of a component of a promotion and marketing service that may receive a promotion recommendation. However, it should also be appreciated that various other electronic marketing communication generation circuitry may be employed, such as circuitry including hardware configured to generate an e-mail, web page, text message, or any other electronic marketing communication.

Although the processor 202 may be employed to perform slot management functions as part of a process for generating electronic marketing information, it should also be appreciated that, in some embodiments, the analytics circuitry 212 may include a separate processor, specially configured field programmable gate array (FPGA), or application specific interface circuit (ASIC) to perform such tasks. The analytics circuitry 212 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

In particular, embodiments of the present invention may leverage knowledge of the server 302 of previous promotion purchases made by a consumer or consumer device to generate promotion recommendations appropriate for that consumer, consumer device, or other consumers. To this end, the server 302 may maintain records of past transactions (e.g., transaction data) performed with a consumer or consumer device. In the context of the present disclosure, a "transaction" may be understood to represent an interaction between a particular consumer and the promotion and marketing service with respect to a particular promotion offered by the promotion and marketing service. Embodiments may be generally described herein where the transaction is a promotion purchase transaction, where a consumer receives or is provided with access to a promotion in exchange for something of value. However, it should also be understood that the techniques described herein could also be applied to alternative forms of transactions, such as impressions by the consumer of web pages associated with particular promotions, views of promotions provided to consumers via an application associated with the promotion and marketing service, and any other interaction which may indicate a relationship between a particular consumer and a particular promotion via the promotion and marketing service. These transactions may be analyzed to generate a set of correlation metrics related to the transactions. In some embodiments, the server 302 may maintain a set of promotion recommendations for each consumer, group of consumers, consumer device, or consumers having a particular characteristic, where the promotion recommendations are generated based on correlation metrics derived from electronic marketing information, such as transaction data.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by improving the quality of electronic marketing communications transmitted from the server 302 to the consumer devices 304 by providing for improved promotion recommendations for inclusion in said electronic marketing communications. In this manner, embodiments offer improvements to the methods by which particular promotions are selected for recommendation and targeted to particular consumers. In particular, embodiments provide improved techniques for evaluating various electronic data associated with consumers and previous transactions, along with sophisticated evaluation and filtering techniques for ensuring a proper number of promotions are recommended, that said recommended promotions are selected in an optimal way, and that said recommendations meet certain quality metrics before transmission to the consumer device. These improvements serve to reduce the number of electronic marketing communications that must be sent by the server 302 in order to produce sales, conserving system resources. Furthermore, by providing more accurate recommendations, the consumer may gain the same benefit with less system interaction, thus conserving system resources and improving the technical functionality of both the consumer devices 304 and the server 302.

Example Interactions Among a Recommendation Engine and Various Components of a Promotion and Marketing Service FIG. 4 illustrates an example data flow interaction between a recommendation engine 402 and components of a promotion and marketing service in accordance with some example embodiments of the present invention. The recommendation engine 402 may communicate with other components of a promotion and marketing service in order to provide promotion recommendations for use in electronic marketing communications. In the present example, the recommendation engine 402 is operable to receive promotion recommendation inquiries from a variety of sources and interact with a set of databases (e.g., information stored in a memory or memories, such as the memory 204 described above with respect to FIG. 2.) to generate a set of correlation metrics and generate one or more promotion recommendations based on the correlation metrics.

The recommendation engine 402 may be provided by a server such as described above with respect to FIGS. 1, 2, and 3. As noted above, the recommendation engine may be provided by one or more components and/or specially configured circuitry. As noted above, recommendation engine circuitry 212, such as described above with respect to FIG. 2, may provide some or all of the functionality as described herein with respect to the recommendation engine 402. Data utilized by the recommendation engine 402 may be received via a network interface such as provided by communications circuitry 208, and stored via a memory such as provided by the memory 204 as described above with respect to FIG. 2. The recommendation engine 402 may further interface with promotion management circuitry 210 to assist with the generation, management, and monitoring of promotions offered by a promotion and marketing service as described above with respect to FIG. 2.

The recommendation engine 402 may provide promotion recommendations in response to promotion recommendation inquiries from various different sources. The present example illustrates a first example 404, a second example 406, and a third example 408 of the different manners in which promotion recommendation inquiries may be received and processed by the recommendation engine 402.

The first example 404 illustrates a promotion recommendation inquiry generated by a slot manager 424 on behalf of a content generator. The slot manager 424 may be implemented by or in conjunction with slot manager circuitry 214 as described above with respect to FIG. 2. In the first example 404, the slot manager 424 receives a request to generate an electronic marketing communication from an external application 422. In response to the request, the slot manager 424 selects one or more content generators 426 to be used in generation of the electronic marketing communication. Upon selection of the content generators, the slot manager 424 may receive one or more content requests or other information relating to selection of a promotion for inclusion in the electronic marketing communication. In some embodiments, the content request or other information may indicate to the slot manager 424 that the slot manager 424 should obtain a promotion recommendation related to a consumer's previous promotion purchase history. In such a case, the slot manager 424 may generate a promotion recommendation inquiry to be sent to the recommendation engine 402 via a recommendation API 416.

The second example 406 illustrates a scenario in which a promotion recommendation inquiry is received directly from a content generator 428 without using a slot manager 430 as a go-between. In the second example 406, a slot manager 430 has selected one or more content generators 428 to generate an electronic marketing communication. After selection by the slot manager 430, the content generator 428 may be responsible for providing content to the slot manager for insertion into the electronic marketing communication. To obtain such content, in some embodiments the content generator 428 may generate a promotion recommendation inquiry that is sent to the recommendation engine 402 via the recommendation API 416.

The third example 408 illustrates a scenario in which a promotion recommendation inquiry is transmitted directly to the recommendation engine 402 by an external application 432. The third example 408 thus illustrates a case in which, for example, a website requests a set of promotion recommendations for display without using an intermediary such as a slot manager. It should be appreciated that the external application 432 may have one of many different types. For example, the external application 432 may include a server hosting a consumer-specific web page (e.g., a web page dynamically populated with content based on discernible attributes of the viewer), a static web page, an automated marketing e-mail generation application, or the like. The external application 432 may send a promotion recommendation inquiry to the recommendation engine 402 using the recommendation API 416.

The recommendation API 416 may refer to any component of the recommendation engine operable to receive a promotion recommendation inquiry. As described herein, example embodiments of the recommendation engine may include an application programming interface defining particular functions and data values to be passed to the recommendation engine 402 for the purpose of requesting promotion recommendations. It should also be appreciated however, that some embodiments of the recommendation engine may include alternative methods, processes, and components for providing an interface for requesting promotion recommendations other than an API. For example, embodiments may include a particular network messaging format for communicating with a specially configured device or apparatus for the purpose of requesting promotion recommendations that is not provided as part of an API.

The recommendation API 416 may receive the promotion recommendation inquiry and notify an analytics engine 420 of the nature and/or contents of the promotion recommendation inquiry. The analytics engine 420 may function to extract relevant portions of the promotion recommendation inquiry, analyze the extracted portions in conjunction with a set of analytics data derived from consumer transaction information, select one or more recommended promotions based on the analysis, and provide the selected recommended promotions back to the recommendation API 416 for transmission in reply to the promotion recommendation inquiry.

In this regard, the analytics engine 420 may receive information on past consumer transactions from a consumer transaction information database 412. The consumer transaction information database 412 may include data identifying which consumers have purchased which promotions, when the promotions were purchased, the cost of said purchases, the type of promotions purchased, the redemption of purchased promotions, and/or any other information relating to particular consumer transaction activities and promotions. Using the consumer transaction information, the analytics engine 420 may determine a set of correlation metrics which may be employed to evaluate the strength of correlations between purchases of particular promotions. Based on these correlation metrics, the analytics engine 420 may generate a promotion recommendation database 414 including one or more sets of promotion recommendations for particular consumers.

The analytics engine 420 may also communicate with a promotion interface 418 to access a promotion database 410. The promotion interface 418 may include components operable to provide information to the analytics engine 420 stored in the promotion database 410 regarding current and past promotions offered by a promotion and marketing service, including but not limited to quantities available, expiration dates, prices, and the like. The analytics engine 420 may use information provided by the promotion interface 418 to identify particular promotions for recommendation and for filtering of promotion recommendations to ensure that recommended promotions are not expired, unavailable, or otherwise invalid. Example embodiments of methods, processes, and operations of a recommendation engine are described further below with respect to FIGS. 5-7.

Example Process for Generating Promotion Recommendations

Turning now to FIG. 5, example operations for generating promotion recommendations are illustrated from the perspective of a promotion and marketing service that incorporates a recommendation engine. The operations illustrated in FIG. 5 may, for example, be performed by elements of the promotion and marketing service 102 (e.g., server 104) described with respect to FIG. 1, with the assistance of, and/or under the control of one or more devices, such as apparatus 200. In particular, embodiments of a process 500 may be performed by recommendation engine circuitry 212 as described above with respect to FIG. 2. The recommendation engine circuitry 212 may provide means for performing the various actions described with respect to the process 500.

FIG. 5 depicts a process 500 that may be employed to generate promotion recommendations based on past promotion purchase transactions performed using a promotion and marketing service. The promotion recommendations generated by the process 500 may be employed in a variety of contexts and for a variety of purposes. In particular, embodiments may utilize generated promotion recommendations to generate electronic marketing communications that are transmitted to consumers for the purpose of providing marketing services by a promotion and marketing service.

At action 502, promotion transaction data is received. As indicated above, the promotion transaction information may include electronic data that identifies consumers and promotions associated with transactions performed via a promotion and marketing service. For example, every time a consumer exchanges currency or other items of value for a promotion, the promotion and marketing service may store information indicating which consumer received the promotion, which promotion was received, the amount of value (e.g., the price in currency or credit) exchanged for the promotion, the type of promotion, and/or various other data. The promotion transaction data may thus provide a record of which promotions were purchased by which consumers, and various other metadata relating to the transaction(s). In some embodiments, consumer data may be aggregated or anonymized. For example, some embodiments may provide the consumer the ability to "opt out" of having their particular transaction data used for personalized marketing recommendations, though some embodiments may utilize aggregated data or data that otherwise has consumer identification information redacted to provide promotion recommendations. In some embodiments, transaction information may be linked to particular consumer characteristics, such as consumer age, location, or the like rather than particular individual consumers.

The promotion transaction data may be received from a billing component or e-commerce component of the promotion and marketing system. Additionally or alternatively, the promotion transaction data may be stored in a database that is accessible by a recommendation engine or other system configured to retrieve the promotion transaction data. In some embodiments, recommendation engine circuitry, such as the recommendation engine circuitry 212 described above with respect to FIG. 2, provides a means for receiving the promotion transaction data. In some embodiments, the recommendation engine circuitry acts in conjunction with a network interface, such as provided by the communications circuitry 208 described above with respect to FIG. 2 to provide a means for receiving the promotion transaction data.

In some embodiments, receiving of the transaction data includes organizing the transaction data into a particular data structure or data structures. For example, transactions for particular consumers may be organized into data tables associated with those consumers. In a particular example, such a table may include columns for a unique identifier (e.g., an identification cookie, user key, or the like) for each user, a column for each of the last three promotions purchased by the user which may in turn include an identifier for the promotion, a date of each promotion purchase, and the like.

At action 504, promotion correlation metrics are determined based on the transaction data. Promotion correlation metrics may include a variety of statistical data derived from transactions performed between the consumer and a promotion and marketing service, and these metrics may be calculated in a variety of ways. Promotion correlation metrics may be determined for each "promotion cluster" identified from the transaction data. In the context of the present disclosure, the term "promotion cluster" is understood to refer to any grouping of two or more promotions. Some embodiments may generate correlation data for all possible promotion clusters (e.g., complete, brute force evaluation of each possible correlation relationship among all promotions), while other embodiments may selectively determine which promotion clusters to evaluate for correlation metrics. For example, in some embodiments, only promotion clusters that are purchased by the same consumer may be included for generation of correlation metrics. In this manner, some example embodiments may reduce the amount of processing and other system resources in generating correlation metrics for identifying promotion recommendations.

In particular, embodiments may leverage the use of "triplets" to identify correlations between a pair of transactions and a third transaction. For example, rather than examining only single promotion transactions or pairs of promotion transactions, embodiments may examine promotion clusters of three promotions to determine whether consumers who purchased a promotion A and a promotion B, also typically purchase promotion C. Triplets may also include a particular ordering, such that a triplet {A, B, C} is different from a triplet {A, C, B}. The ordering of a triplet may be utilized to identify which pair of promotions is to be evaluated to determine the impact on the third promotion. The use of triplets may improve the detection of correlations between transactions for particular promotions as compared to analysis of single promotions or pairs of promotions. In some embodiments the promotion correlation metrics may include metrics for "support," "confidence," "lift," and "coverage."

In the context of the present application, the term "support" is understood to be a metric for determining whether a promotion is sufficiently successful to warrant being included in a promotion recommendation operation. If the support metric is low, it indicates that the promotions included in the triplet have a low success rate in turning promotion views into completed orders, reducing the value in making a promotion recommendation based on the triplet. For example, "support" for a particular triplet may be determined by a formula (1):

$$\text{Support}\{A,B,C\}=\text{orders}\{A,B,C\}/\text{views}\{A,B,C\} \quad (1)$$

Where orders {A, B, C} is equal to the number of purchase transactions for the set of three promotions, "A," "B," and "C" (e.g. a number of times a consumer has purchased all three promotions), views {A, B, C} is equal to the number of page views for the set of three promotions (e.g., a number of times a consumer has viewed all three promotions), and Support is a floating point value for a correlation metric relating the number of orders for the group of three promotions to the number of views of the three promotions.

In the context of the present application, the term "confidence" is understood to be a metric for determining whether a sufficient relationship exists between two promotions of a triplet and the third promotion of the triplet. A high confidence value indicates a strong relationship between the purchases of the first two promotions with the third promotion, such that if a user purchases the first two promotions, they are also likely to purchase the third. A given set of three promotions may have three different confidence values associated with three different triplets, reflecting the fact that different correlations may exist between any two promotions of a triplet and the third promotion (e.g., A and B→C, A and C→B, and B and C→A may each have different correlation metrics). For example, confidence for a relationship between a promotion pair {A, B} and a set of promotions {A, B, C} may be determined by a formula (2):

$$\text{Confidence}\{A,B,C\}=(\#\text{Orders}\{A,B,C\}/\#\text{Views}\{A,B,C\})/(\#\text{Orders}\{A,B\}/\#\text{Views}\{A,B\}) \quad (2)$$

Formula (2) illustrates calculation of a confidence correlation metric by comparing the success rate at which promotions are purchased for a pair of promotions (e.g., the conversion rate of views to orders for consumers who viewed both promotions A and B) to the success rate at which promotions are purchased for the triplet (e.g., the conversion rate for consumers who viewed all three of promotions A, B, and C). As such, the confidence rate for the triplet may be employed to determine the strength of the link between the first two promotions of the triplet and the third. [Yes it looks good.]

In the context of the present application, the term "lift" is understood to refer to a correlation metric that evaluates the additional likelihood of conversion for a particular promotion triplet by adding the third promotion to the triplet. For example, a set of three promotions {A, B, C} that has a higher order conversion rate than individual conversion rates for the set {A, B} and the set {C} would have a high "lift" value. As noted above with respect to the confidence metric, a given set of three promotions may have different lift metrics based on the ordering of the promotions. For example, lift for a relationship between a promotion pair {A, B} and a promotion {C} may be determined by formula (3):

$$\text{Lift}\{A,B,C\}=\text{Support}\{A,B,C\}/(\text{Support}\{A,B\}*\text{Support}\{C\}) \quad (3)$$

In the context of the present application, the term "coverage" refers to a measurement of the number of times the same consumer purchased each of the three promotions of a triplet. A coverage correlation metric may be useful to determine if a statistically significant sample size exists for evaluating a given triplet. For example, if only a single consumer has ever viewed and purchased a given set of promotion triplets, then the coverage metric may be low. Embodiments may filter out triplets with low coverage scores from being used to generate promotion recommendations due to the fact that the correlation metrics may not reflect statistically significant results.

Some embodiments may impose constraints on selection of transaction data to be processed to determine correlation metrics. For example, embodiments may select consumers with a minimum ranking in purchases as compared to all consumers (e.g., analyzing only consumer transaction data from consumers in the top 1,000 by number of promotion purchases or the top 25% by number of purchases among all consumers). Yet further embodiments may constrain the use of transaction data by other criteria, such as criteria related to promotion page views (e.g., data from consumers who have viewed at least three pages associated with promotions offered by the promotion and marketing service).

The specific examples of correlation metrics enumerated above should not be taken as limiting the claimed invention. For example, embodiments may leverage the use of some, all, or none of these correlation metrics, and some embodiments may utilize additional or alternative correlation metrics not described herein.

It should thus be appreciated that in some embodiments, correlation metrics may be generated in an "offline" manner, where the correlation metrics are generated prior to receiving a promotion recommendation inquiry. In such embodiments, the correlation metrics may be generated at periodic intervals (e.g., once per day, once per week, or the like), or based on particular events. For example, correlation metrics may be generated or updated every time a certain number of transactions are performed by a promotion and marketing service, every time a new promotion is added to the promotion and marketing service, every time sufficient system resources exist to review or revise the correlation metrics without impacting other functionality of a promotion and marketing service, every time definitions for the correlation metrics are updated, or any other scenario. In other embodiments, correlation metrics may be generated dynamically in response to promotion recommendation inquiries. For example, upon receiving a promotion recommendation inquiry, embodiments may identify promotions associated with a consumer that is the subject of the promotion recommendation inquiry, and examine the promotions in the consumer's transaction history. The promotions present in the consumer's transaction history may be used as a basis for identifying promotions or promotion clusters for which correlation metrics are generated.

Some embodiments may employ a hybrid rationale for updating correlation metrics. Such embodiments may generate a set of correlation metrics at a particular interval, and update the correlation metrics at the time of receiving a promotion recommendation inquiry. For example, a list of correlation metrics for promotions associated with a particular consumer may be generated periodically, and then reorganized or ranked in response to a particular promotion recommendation inquiry.

The promotion correlation metrics may be determined by means for determining promotion correlation metrics, such as the recommendation engine circuitry 212 described above with respect to FIG. 2. An example embodiment of a process for calculating the promotion metrics is described further below with respect to FIG. 6.

At action 506, a promotion recommendation inquiry is received. As noted above, the promotion recommendation inquiry may include electronic data received from a variety of sources in a variety of formats. The promotion recommendation inquiry may include a request for a promotion recommendation initiated by a source external to a recommendation engine, such as a slot manager, content generator, or other application or system. The promotion recommendation inquiry may include electronic data sufficient to identify a particular consumer. It should be appreciated that in some embodiments the promotion recommendation inquiry may be initiated by another component of the same device or system that provides the recommendation engine, while in other embodiments the promotion recommendation inquiry may be initiated by another device or system located internally or externally to a promotion and marketing service. The promotion recommendation inquiry may be received by means for receiving a promotion recommendation inquiry, such as recommendation engine circuitry 212 as described above with respect to FIG. 2, or recommendation engine circuitry 212 acting in conjunction with communications circuitry 208 as described above with respect to FIG. 2.

At action 508, one or more promotion recommendations are determined for a consumer associated with the promotion recommendation inquiry based on the promotion correlation metrics. Determination of the recommended promotion may include identifying one or more promotions previously purchased by the consumer, and determining whether the promotions previously purchased by the consumer are correlated with third promotions to identify triplets. Correlation metrics associated with the triplets may be evaluated to determine if the third promotion of the triplet is sufficiently correlated with the consumer's promotion purchase history to warrant a recommendation of the third promotion. Example embodiments of a process for selecting a promotion as a recommendation based on correlation metrics are described further below with respect to FIG. 7. The promotion recommendations may be determined by means for determining promotion recommendations, such as the recommendation engine circuitry 212 described above with respect to FIG. 2.

At action 510, the promotion recommendations are filtered to remove invalid promotions. As noted above, promotions may have limited quantities, promotions may have particular expiration dates, promotions may only be offered for a limited time, promotions may only be offered in particular locations, promotions that have been recommended more than once, and the like. All of these factors may result in certain promotion recommendations being invalid for particular circumstances. For example, even promotions which have exceptionally high correlation metrics may be improper to recommend to a particular consumer if the recommended promotion is no longer available, not available in the location of the particular consumer, or otherwise inappropriate. Embodiments may thus filter invalid promotions to ensure such invalid promotions are not recommended. Filtering of the promotion recommendations may be performed by means for filtering invalid promotions, such as the recommendation engine circuitry 212 described above with respect to FIG. 2.

At action 512, a determination is made as to whether a sufficient number of promotions are recommended to exceed a threshold number of recommendations for responding to the promotion recommendation inquiry. In some embodiments, the promotion recommendation inquiry may specify a certain number of requested promotion recommendations. For example, an external application may request five promotion recommendations for a particular electronic marketing communication being generated for a particular consumer. If five promotions are not recommended (e.g., less than five promotions meet certain threshold criteria for correlation metrics to be used as a recommendation), or less than five promotions remain after filtering for invalid promotions, then the process 500 may take actions to identify additional promotion recommendations to respond to the promotion recommendation inquiry. If sufficient promotion recommendations have not been identified, the process proceeds to action 514 to select an alternative recommendation methodology. If a sufficient number of promotions have been recommended, embodiments may proceed to action 516 where the recommended promotions are provided in response to the inquiry.

At action 514, an alternative recommendation methodology may be selected. Embodiments of the process 500 may include multiple different methodologies for selecting promotion recommendations. If a first methodology fails to identify a sufficient number of promotion recommendations, a second, less stringent methodology may be selected. For example, a first methodology may select a promotion for recommendation based on promotion triplet data. However, if none of the available promotion triplets identified based on a set of consumer transaction information meet a minimum threshold of correlation metrics, then embodiments may instead use pair data. As another example, if a first methodology using promotion purchase transactions fails to identify a sufficient number of promotion recommendations, a second methodology using promotion page view transactions may be employed to identify additional recommendations. As yet another example, different methodologies may identify similar or related promotions rather than the specific promotions identified from prior transactions. For example, a first methodology may attempt to identify promotions that are identical to other promotion purchases. If this methodology fails to identify a sufficient number of promotion recommendations, a second methodology may be employed that substitutes similar promotions for promotions that are otherwise invalid or unavailable. For example, if a first promotion methodology would recommend a promotion for a particular coffee shop, but that promotion is no longer available, a second promotion methodology might identify a similar promotion for a different coffee shop instead.

As a particular example, one embodiment may employ a first methodology related to the use of promotion purchase transaction triplets. If the first methodology fails to identify a sufficient number of promotions, a second methodology may identify similar promotions from the same category or sub-category from promotion transaction triplets. If the second methodology still fails to identify a threshold number, a third methodology may be employed that uses pair data instead of triplet data. A fourth methodology that identifies similar promotions based on pair data may be employed if the third methodology fails to identify a threshold number. A fifth methodology that uses promotion view transactions (e.g., web page impressions for pages related to particular promotions) may be employed if the fourth methodology still fails to satisfy the requirement for a threshold number of recommendations. It should be appreciated that such methodologies may be implemented in a hierarchical manner, with methodologies that are more likely to provide specifically tailored recommendations (e.g., recommendations generated from triplet promotion clusters) are employed before falling to recommendations that are less likely to provide specifically tailored recommendations (e.g., recommendations generated from pairwise promotion clusters).

It should be appreciated that any number of methodologies may be employed to ensure selection of at least a particular number of promotion recommendations. Some embodiments may include a default methodology if it is otherwise impossible to identify a threshold number of promotion recommendations. For example, a default methodology may include randomly selecting a promotion from all available promotions. In this manner, a variety of methodologies may be employed in descending order of quality (e.g., a promotion recommendation received from triplet data is likely to be more accurate than a promotion recommendation from pair data or a promotion recommendation from page views), thus ensuring that a sufficient number of promotions are recommended and that the recommended promotions are of the highest quality. Selection of the promotion methodology may be performed by means for selecting a promotion methodology, such as the recommendation engine circuitry described above with respect to FIG. 2.

Additional example embodiments of methodologies that may be employed for selecting promotion recommendations are described further in U.S. Provisional Patent Applications 61/989,960 and 61/989,968, filed on May 7, 2014, both of which are hereby incorporated by reference in their entirety. After selecting an alternative methodology, the process returns to action 508 to determine promotion recommendations using the newly selected methodology.

At action 518, once at least as many promotion recommendations as will satisfy the promotion recommendation threshold have been selected, the promotion recommendations are provided to the entity that initiated the promotion recommendation inquiry. The promotion recommendations may be provided to the requesting entity by means for providing the promotion recommendations, such as the recommendation engine circuitry 212 or the recommendation engine circuitry 212 acting in conjunction with the communications circuitry 208 as described above with respect to FIG. 2.

Example Process for Generating Correlation Metrics

As noted above, embodiments of the present invention utilize correlation metrics to assist with generating promotion recommendations. Turning now to FIG. 6, a process 600 is described to illustrate particular methods and operations for generating these correlation metrics based on transaction data associated with a set of promotions. The process 600 illustrates a specific example of a technique for analyzing and processing transaction data to generate correlation metrics for a set of promotion transactions. The process 600 may be performed by means for generating correlation metrics, such as recommendation engine circuitry 212 as described above with respect to FIG. 2. One the correlation metrics have been generated, they may be stored via a storage means, such as the memory 204 described above with respect to FIG. 2.

At action 602, an input set of promotion transactions may be constrained to reduce the data set used to generate the correlation metrics. Constraining the input data may simplify the process of generating correlation metrics. For example, embodiments may only examine transaction data associated with particular consumers or groups of consumers. In some cases, input may be constrained to a set of consumers identified as "most engaged", such as consumers who have purchased items most recently, with at least a particular frequency, or within a particular time frame. As a specific example, some embodiments may consider data relating to consumers that have both made a recent purchase and have at least a threshold number of purchases extending over a longer period of time (e.g., examine data from consumers that have at least one purchase in the last month and at least three purchases made in the last six months). Other embodiments may examine data from all consumers. As another specific example, some embodiments only examine transaction data relating to a top one thousand consumers of a promotion and marketing service in terms of sales volume or number of purchases. The selection of input data to be used in generating the correlation metrics may be performed by means for constraining the input data set, such as the recommendation engine circuitry described above with respect to FIG. 2.

At action 604, correlation metrics are calculated for the promotion clusters identified in the transaction data. As described above, these correlation metrics may indicate relationships between particular promotions over a large set of purchases in order to identify scenarios where promotions are frequently purchased together. As described above, these correlation metrics may include various measurements of how promotions in a given promotion cluster are related to one another. For example, promotions may be evaluated as triplets as described above. It should be appreciated that generation of the correlation metrics may be limited to only scenarios where promotions are purchased by the same consumer. For example, the correlation metric generation process may identify promotion clusters from the transaction data such that only groups of promotions that have at least a threshold number of purchases by the same consumer are evaluated during the correlation metric generation process. Alternatively, as described above, promotion clusters may be identified only from data associated with a particular group of consumers, such as the "most engaged" consumers as described above. Constraining identification of promotion clusters in this manner may advantageously reduce the computational complexity of the identification process, reduce "noise" and erroneous data, and improve the relevancy of recommendations derived from the promotion clusters. As a particular example, correlation metrics may only be generated if there are at least 5, 10, or 50 instances of a set of promotions being purchased together or by the same consumer. Generation of the correlation metrics may be performed by means for generating correlation metrics, such as the recommendation engine circuitry as described above with respect to FIG. 2.

At action 606, the generated correlation metrics may be filtered to identify correlation metrics that are strong enough to likely result in good recommendations. For example, embodiments may determine if lift, support, and confidence metrics associated with a particular promotion triplet or promotion pair satisfy threshold values to be used in generating a promotion recommendation. In this manner, relationships that fail to meet certain base thresholds for correlation are eliminated from consideration in a recommendation process. The generated correlation metrics may be filtered by means for filtering correlation metrics, such as the recommendation engine circuitry 212 described above with respect to FIG. 2.

At action 608, the correlation metrics are stored for later use in a promotion recommendation process. In some embodiments, only correlation metrics and their attendant promotion clusters that satisfy the minimum thresholds identified at action 606 are stored for later use. In some embodiments, storing of the correlation metrics may be provided via a means for storing correlation metrics, such as the recommendation engine circuitry 212 acting in conjunction with a memory, such as the memory 204, as described above with respect to FIG. 2.

Example Process for Selecting Promotion Recommendations Using Correlation Metrics As noted above, embodiments of the present invention utilize correlation metrics to assist with generating promotion recommendations. Turning now to FIG. 7, a process 700 is described to illustrate particular methods and operations for using these correlation metrics to generate promotion recommendations in response to a promotion recommendation inquiry. These promotion recommendations may be tailored to a particular consumer or consumer characteristic identified by the promotion recommendation inquiry. The process 700 illustrates a specific example for generating promotion recommendations using correlation metrics. The process 700 may be performed by means for generating promotion recommendations using correlation metrics, such as recommendation engine circuitry 212 as described above with respect to FIG. 2. One the promotion recommendations have been generated, they may be stored via a storage means, such as the memory 204 described above with respect to FIG. 2, or transmitted via a communications means, such as the communications circuitry 208 described above with respect to FIG. 2.

At action 702, a consumer associated with a promotion inquiry is determined. The promotion inquiry may be received as part of a promotion recommendation generation process, such as described above with respect to FIGS. 4-5. As noted above, the promotion inquiry may include data identifying a particular consumer, such as a unique identifier. In some embodiments, a particular individual consumer is not identified in the promotion recommendation inquiry, and the promotion recommendation inquiry instead includes data identifying particular consumer characteristics (e.g., consumer demographics, channel data, location data, clickstream data, or the like). In such a case, the particular consumer characteristics may be employed to identify correlation metrics that are associated with other consumers that have one or more of the same or similar characteristics. The consumer may be identified by means for determining a consumer associated with a promotion recommendation inquiry, such as the recommendation engine circuitry described above with respect to FIG. 2.

At action 704, a transaction history associated with the consumer identified at action 702 is determined. As noted above, the transaction history may be data for a particular consumer (e.g., a consumer associated with a unique identifier), or an aggregation of transaction data provided by similar consumers. The promotion transaction history may include a list of each promotion purchased by the consumer or similar consumers. The consumer promotion transaction history may be determined by interfacing with a transaction database. For example, a given transaction database may include information on all transactions performed by a consumer using a promotion and marketing service. The consumer promotion transaction history may be determined by means for determining the consumer promotion transaction history, such as the recommendation engine circuitry 212 described above with respect to FIG. 2.

At action 706, correlation metrics are identified for promotions or promotion clusters based on the consumer promotion transaction history. As noted above with respect to FIGS. 4-6, correlation metrics may be generated and stored for later use in promotion recommendation operations, or the correlation metrics may be generated dynamically in response to promotion recommendation inquiries. Determination of the correlation metrics may be performed by calculating the correlation metrics based on the promotions included in the consumer promotion transaction history, or looking up the correlation metrics for promotions included in the consumer promotion transaction history from a set of stored correlation metrics. For example, promotion clusters may be defined by identifiers for the particular promotions, and indexed in a data table by cluster identifiers. Embodiments may use these promotion cluster identifiers as an index to the data table to obtain correlation metrics for the promotion cluster.

Correlation metrics may be determined for each promotion cluster identified within the consumer's promotion transaction history. For example, if a consumer promotion transaction history includes five purchases, and the correlation metrics relate to promotion triplets (e.g., identification of where a pair of promotion transactions is correlated with a third promotion transaction), then embodiments may determine correlation metrics for each possible pair of promotions included in the consumer's transaction history, resulting in ten possible promotion clusters. These ten promotion clusters may be analyzed to determine whether the associated correlation metrics meet a minimum correlation metric threshold. If the associated correlation metrics meet the minimum threshold, then the associated promotion cluster will be identified as a possible promotion recommendation.

In some embodiments, minimum thresholds for multiple correlation metrics may be established. For example, a minimum number of transactions for a given promotion cluster may be set at five, a minimum confidence metric may be defined at 0.03, and a minimum lift metric may be defined at 1.1. Promotion clusters that do not satisfy all of these minimum correlation metrics may be eliminated from being suggested as promotion recommendations. However, it should be readily appreciated that embodiments may vary these minimum correlation metrics, establish other correlation metrics, or not utilize minimum correlation metrics at all. In some embodiments, the minimum correlation metrics may be dynamically and programmatically alterable based on the amount of data available, the types of data available, the number of recommendations available, the number of consumers, and various other factors.

It should be appreciated that a given pair of promotions or grouping of promotions within the transaction history may map to a plurality of promotion clusters, and thus may result in more than one promotion recommendation. For example, if the correlation metrics indicate that two promotions, A and B, are strongly correlated with two different promotions, C, and D (such that the promotion clusters for triplets (A, B, C) and (A, B, D) both have high correlation metrics), then both C and D may be identified as possible promotion recommendations for consumers that have transaction histories indicating transactions performed with respect to both A and B. The correlation metrics may be determined from the consumer promotion transaction history by a means for determining correlation metrics, such as the recommendation engine circuitry 212 described above with respect to FIG. 2.

At action 708, one or more recommended promotions are selected based on the determined correlation metrics. As noted above, the correlation metrics may be filtered based on certain minimum values, such that only promotions that meet certain standards for correlation with the promotion transaction history of the consumer are selected as recommended promotions. Upon selection of a particular promotion as a recommended promotion, embodiments may provide the particular promotion as a promotion recommendation to other components of the promotion and marketing service or recommendation engine. For example, the selected promotion may be evaluated by another process (e.g., the process 500 described above with respect to FIG. 5) to ensure that the promotion is not invalid. The recommended promotion may be selected based on the determined correlation metrics by means for selecting a recommended promotion, such as the recommendation engine circuitry 212 described above with respect to FIG. 2.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for providing promotion recommendations based on electronic promotion transactions performed by consumer devices using a promotion and marketing service, the method comprising:

determining, via processing circuitry, a plurality of promotion clusters from electronic transaction data stored in a memory, the electronic transaction data indicating at least one electronic transaction performed by a consumer device, wherein each promotion cluster of the plurality of promotion clusters comprises at least three promotions;

dynamically in response to a promotion recommendation inquiry, determining, via the processing circuitry, one or more correlation metrics for each promotion cluster of the plurality of promotion clusters, the one or more correlation metrics for each promotion cluster indicative of a relationship between a selected promotion of the promotion cluster and a selected pair comprising a first promotion and second promotion of the promotion cluster, wherein the relationship represents a programmatically generated likelihood that a consumer will purchase the selected promotion of the promotion cluster if the consumer purchases both the first promotion and the second promotion of the promotion cluster;

storing, by the processing circuitry, the one or more correlation metrics in the memory;

generating, by the processing circuitry, at least one promotion recommendation based at least in part on the one or more correlation metrics;

filtering, via processing circuitry, the at least one promotion recommendation based on a determination as to whether the at least one promotion recommendation is valid;

in response to determining that the at least one promotion recommendation is valid, generating, via the processing circuitry, an electronic marketing communication comprising the at least one promotion recommendation; and transmitting, via communications circuitry, the electronic marketing communication to a consumer device;

wherein a correlation metric of the one or more correlation metrics is one of a support metric representing a programmatically generated success rate associated with a promotion in turning promotion views into purchases, a confidence metric representing a programmatically generated strength of the relationship between the selected promotion and the selected pair of the promotion cluster, a lift metric representing a programmatically generated likelihood that a consumer will purchase all three promotions of a promotion cluster by adding the selected promotion to the promotion cluster, or a coverage metric representing a programmatically generated measurement of a number of times an individual consumer purchased each of the three promotions of the promotion cluster.

2. The method of claim 1, further comprising:
in response to determining that the at least one promotion recommendation is not valid, selecting, via the processing circuitry, an alternative promotion recommendation and generating the electronic marketing communication using the alternative promotion recommendation instead of the at least one promotion recommendation.

3. The method of claim 2, wherein the alternative promotion recommendation comprises at least one characteristic in common with the at least one promotion recommendation.

4. The method of claim 3, wherein the at least one characteristic is at least one of a merchant type, a location, a redemption parameter, or an offering parameter.

5. The method of claim 1, wherein the filtering of the at least one promotion recommendation further comprises at least one of determining, via the processing circuitry, whether the at least one promotion recommendation is expired, determining, via the processing circuitry, whether the at least one promotion recommendation has a valid location, or determining, via the processing circuitry, whether the at least one promotion has a sufficient quantity available.

6. The method of claim 1, further comprising:
determining, via the processing circuitry, that the at least one promotion recommendation includes less than a threshold number of promotion recommendations; and
selecting, via the processing circuitry, an alternative promotion recommendation methodology other than a first promotion recommendation methodology in response to determining that the at least one promotion recommendation includes less than a threshold number of promotion recommendations, wherein the at least one promotion recommendation is generated by the first promotion recommendation methodology and the alternative promotion recommendation is generated by the alternative promotion recommendation methodology.

7. The method of claim 6, wherein determining that the at least one promotion includes less than the threshold number of promotion recommendations is performed after filtering the at least one promotion recommendation.

8. The method of claim 6, wherein the alternative promotion recommendation methodology selects the alternative promotion recommendation based on analysis of promotion cluster pairs and the first promotion recommendation methodology selects the at least one promotion recommendation based on analysis of promotion cluster triplets.

9. The method of claim 1, wherein the electronic marketing communication is transmitted to the consumer device in response to the promotion recommendation inquiry received via a promotion recommendation application programming interface (API) that allows one or more of external devices, external computing systems, and external circuitry to electronically submit promotion recommendation inquiries.

10. The method of claim 1, wherein the processing circuitry comprises circuitry including hardware further configured to generate one or more of an e-mail, web page, and a text message.

11. An apparatus for providing promotion recommendations based on electronic promotion transactions performed by consumer devices using a promotion and marketing service, the apparatus comprising:
promotion management circuitry configured to:
offer at least one promotion for sale via a promotion and marketing service;
perform, via the promotion and marketing service, at least one electronic transaction between a consumer device and the promotion and marketing service to offer, via the electronic transaction, the at least one promotion to the consumer device;
store a set of electronic transaction data in a memory, the set of electronic transaction data comprising electronic data indicating the at least one transaction;
recommendation engine circuitry configured to:
determine a plurality of promotion clusters from the set of electronic transaction data, wherein each promotion cluster of the plurality of promotion clusters comprises at least three promotions;
dynamically in response to a promotion recommendation inquiry, determine one or more correlation metrics for each promotion cluster of the plurality of promotion clusters, the one or more correlation metrics indicative of a relationship between a selected promotion of the promotion cluster and a selected pair comprising a first promotion and second promotion of the promotion cluster, wherein the relationship represents a programmatically generated likelihood that a consumer will purchase the selected promotion of the promotion cluster if the consumer purchases both the first promotion and the second promotion of the promotion cluster;

store the one or more correlation metrics in the memory;

generate at least one promotion recommendation based at least in part on the one or more correlation metrics; and filter the at least one promotion recommendation based on a determination as to whether the at least one promotion recommendation is valid;

electronic marketing communication generation circuitry configured to:

in response to determining that the at least one promotion recommendation is valid, generate an electronic marketing communication comprising the at least one promotion recommendation; and transmit the electronic marketing communication to the consumer device;

wherein a correlation metric of the one or more correlation metrics is one of a support metric representing a programmatically generated success rate associated with a promotion in turning promotion views into purchases, a confidence metric representing a programmatically generated strength of the relationship between the selected promotion and the selected pair of the promotion cluster, a lift metric representing a programmatically generated likelihood that a consumer will purchase all three promotions of a promotion cluster by adding the selected promotion to the promotion cluster, or a coverage metric representing a programmatically generated measurement of a number of times an individual consumer purchased each of the three promotions of the promotion cluster.

12. The apparatus of claim 11, wherein the recommendation engine circuitry is further configured to in response to determining that the at least one promotion recommendation is not valid, select an alternative promotion recommendation and generate the electronic marketing communication using the alternative promotion recommendation instead of the at least one promotion recommendation.

13. The apparatus of claim 12, wherein the alternative promotion recommendation comprises at least one characteristic in common with the at least one promotion recommendation.

14. The apparatus of claim 13, wherein the at least one characteristic is at least one of a merchant type, a location, a redemption parameter, or an offering parameter.

15. The apparatus of claim 11, wherein the recommendation engine circuitry is configured to filter the at least one promotion recommendation further by at least one of determining whether the at least one promotion recommendation is expired, determining whether the at least one promotion recommendation has a valid location, or determining whether the at least one promotion has a sufficient quantity available.

16. The apparatus of claim 11, wherein the recommendation engine circuitry is further configured to:

determine that the at least one promotion recommendation includes less than a threshold number of promotion recommendations; and select an alternative promotion recommendation methodology other than a first promotion recommendation methodology in response to determining that the at least one promotion recommendation includes less than a threshold number of promotion recommendations, wherein the at least one promotion recommendation is generated by the first promotion recommendation methodology and the alternative promotion recommendation is generated by the alternative promotion recommendation methodology.

17. The apparatus of claim 11, wherein the electronic marketing communication is transmitted to the consumer device in response to the promotion recommendation inquiry received via a promotion recommendation application programming interface (API) that allows one or more of external devices, external computing systems, and external circuitry to electronically submit promotion recommendation inquiries.

18. The apparatus of claim 11, wherein the promotion management circuitry comprises circuitry including hardware configured to generate one or more of an e-mail, web page, and a text message.

19. An apparatus for providing promotion recommendations based on electronic promotion transactions performed by consumer devices using a promotion and marketing service, the apparatus comprising at least one processor and at least one memory including computer program code, the at least one memory and the computer program code configured to, with the at least one processor, cause the apparatus to:

determine a plurality of promotion clusters from a set of electronic promotion transaction data stored in the at least one memory, the electronic promotion transaction data comprising electronic data indicating at least one electronic promotion transaction performed by at least one consumer device, each promotion cluster of the plurality of promotion clusters comprising at least three promotions;

dynamically in response to a promotion recommendation inquiry, determine one or more correlation metrics for each promotion cluster of the plurality of promotion clusters, the one or more correlation metrics indicative of a relationship between a selected promotion of the promotion cluster and a selected pair comprising a first promotion and second promotion of the promotion cluster, wherein the relationship represents a programmatically generated likelihood that a consumer will purchase the selected promotion of the promotion cluster if the consumer purchases both the first promotion and the second promotion of the promotion cluster;

store the one or more correlation metrics in the at least one memory;

generate at least one promotion recommendation based at least in part on the one or more correlation metrics;

filter the at least one promotion recommendation based on a determination as to whether the at least one promotion recommendation is valid;

in response to determining that the at least one promotion recommendation is valid, generate an electronic marketing communication comprising the at least one promotion recommendation; and transmit the electronic marketing communication to a consumer device;

wherein a correlation metric of the one or more correlation metrics is one of a support metric representing a programmatically generated success rate associated with a promotion in turning promotion views into purchases, a confidence metric representing a programmatically generated strength of the relationship between the selected promotion and the selected pair of the promotion cluster, a lift metric representing a programmatically generated likelihood that a consumer will purchase all three promotions of a promotion cluster by adding the selected promotion to the promotion cluster, or a coverage metric representing a programmatically generated measurement of a number of times an individual consumer purchased each of the three promotions of the promotion cluster.

20. The apparatus of claim 19, further caused to:
in response to determining that the at least one promotion recommendation is not valid, select an alternative promotion recommendation and generate the electronic marketing communication using the alternative promotion recommendation instead of the at least one promotion recommendation.

21. The apparatus of claim 19, wherein the filtering of the at least one promotion recommendation further comprises at least one of determining whether the at least one promotion recommendation is expired, determining whether the at least one promotion recommendation has a valid location, or determining whether the at least one promotion has a sufficient quantity available.

22. The apparatus of claim 19, further caused to:
determine that the at least one promotion recommendation includes less than a threshold number of promotion recommendations; and
select an alternative promotion recommendation methodology other than a first promotion recommendation methodology in response to determining that the at least one promotion recommendation includes less than a threshold number of promotion recommendations, wherein the at least one promotion recommendation is generated by the first promotion recommendation methodology and the alternative promotion recommendation is generated by the alternative promotion recommendation methodology.

23. The apparatus of claim 22, wherein determining that the at least one promotion includes less than the threshold number of promotion recommendations is performed after filtering the at least one promotion recommendation.

24. The apparatus of claim 22, wherein the alternative promotion recommendation methodology selects the alternative promotion recommendation based on analysis of promotion cluster pairs and the first promotion recommendation methodology selects the at least one promotion recommendation based on analysis of promotion cluster triplets.

25. The apparatus of claim 19, wherein the electronic marketing communication is transmitted to the consumer device in response to the promotion recommendation inquiry received via a promotion recommendation application programming interface (API) that allows one or more of external devices, external computing systems, and external circuitry to electronically submit promotion recommendation inquiries.

26. The apparatus of claim 19, further circuitry including hardware configured to generate one or more of an e-mail, web page, and a text message.

* * * * *